(12) United States Patent
Iwamoto et al.

(10) Patent No.: US 7,512,332 B2
(45) Date of Patent: Mar. 31, 2009

(54) CAMERA WITH SUPERIMPOSE INDICATION FUNCTION

(75) Inventors: Shigeru Iwamoto, Saitama (JP); Tadahisa Ohkura, Saitama (JP); Masahiro Nakata, Saitama (JP)

(73) Assignee: Hoya Corporation, Tokyo (JP)

( * ) Notice: Subject to any disclaimer, the term of this patent is extended or adjusted under 35 U.S.C. 154(b) by 658 days.

(21) Appl. No.: 11/153,540

(22) Filed: Jun. 16, 2005

(65) Prior Publication Data

US 2005/0286882 A1  Dec. 29, 2005

(30) Foreign Application Priority Data

Jun. 23, 2004 (JP) .................. P2004-184789

(51) Int. Cl.
  G03B 17/18 (2006.01)
  G03B 13/24 (2006.01)
  G03B 3/10 (2006.01)
  G03B 13/34 (2006.01)

(52) U.S. Cl. .............. 396/147; 396/121; 396/150; 348/341; 348/346; 250/201.2

(58) Field of Classification Search .......... 396/147, 396/148, 150, 121–123, 232–234; 348/234–236, 348/238, 298, 341, 345, 346; 250/201.1, 250/201.4

See application file for complete search history.

(56) References Cited

U.S. PATENT DOCUMENTS 5,696,998 A * 12/1997 Yamada et al. ............. 396/51
6,374,054 B1   4/2002 Schinner
6,859,619 B2   2/2005 Kurosawa

FOREIGN PATENT DOCUMENTS

| JP | 9-160112    | 6/1997 |
| JP | 2002-131825 | 5/2002 |
| JP | 2002-207157 | 7/2002 |
| JP | 2002-268128 | 1/2004 |

OTHER PUBLICATIONS

U.S. Appl. No. 10/759,022 to Kaneko et al., which was filed on Jan. 20, 2004.

* cited by examiner

Primary Examiner—Rochelle-Ann J Blackman
(74) Attorney, Agent, or Firm—Greenblum & Bernstein, P.L.C.

(57) ABSTRACT

A camera has a viewfinder that forms a subject image to be observed, a multipoint auto-focus adjuster that focuses the subject image on the basis of multiple focus points defined on the subject image, a superimposer that superimposes an indicator mark on a position of a given focus point, and a focus point luminance detector that detects a luminance of the position. Then, the superimposer superimposes the indicator mark such that a brightness of the indicator mark increases as the luminance of the position increases.

8 Claims, 12 Drawing Sheets

⊚FOCUS POINTS AND MULTIPLE SEGMENTS

LED BRIGHTNESS

LIGHT ↑

DARK ↓

RELATIONSHIP BETWEEN LUMINANCE LEVEL AND INTEGRAL-TIME

| LUMINANCE LEVEL | INTEGRAL-TIME |
|---|---|
| EV13 ··· | 1mS |
| EV12 ··· | 2mS |
| EV11 ··· | 4mS |
| EV10 ··· | 8mS |
| ⋮ | |
| EV6 ··· | 128mS |
| EV5 ··· | 256mS |
| EV4 ··· | 256mS(Gain 2 TIMES) |
| EV3 ··· | 256mS(Gain 4 TIMES) |
| EV2 ··· | 256mS(Gain 8 TIMES) |

CAMERA WITH SUPERIMPOSE INDICATION FUNCTION

BACKGROUND OF THE INVENTION

1. Field of the Invention

The present invention relates to a camera with a viewfinder, such as a SLR type camera with a reflex viewfinder. Especially, it relates to a viewfinder-indication associated with focusing.

2. Description of the Related Art

In an SLR type camera with a multipoint focusing function, multiple focus points are defined on a subject image observed via a viewfinder, which has a pentagonal roof prism and an eyepiece. In the case of the auto-selection mode, when one focus point (for example, center spot) is in focus, an indicator mark is superimposed on the focus point of the observed image. As for the superimpose indication, illuminators such as LEDs are provided in the viewfinder, and an illuminator corresponding to the selected focus point illuminates light so that the user can view the an indicator mark on the focus point via the viewfinder.

SUMMARY OF THE INVENTION

An object of the present invention is to provide a camera that can superimpose a mark on a subject image so as to be easy to see, regardless of the brightness of the subject.

A camera according to the present invention has a viewfinder that forms a subject image to be observed, and a multipoint auto-focus adjuster that focuses the subject image on the basis of multiple focus points defined on the subject image, and a superimposer that superimposes an indicator mark on a position of a given focus point. For example, the superimposer has an illuminator that illuminates light for forming the indicator mark, and a light guide member that guides the light to the multiple focus points in the viewfinder by reflecting the illuminated light. The mark is, for example, represented by illuminating light, and the mark is associated with focusing. For example, in the case of manual-selection mode, the superimposer may superimpose the indicator mark as a mark representing a focus point selected from a multiple focus points, by a user. On the other hand, in the case of the auto-selection mode, the superimposer may select one focus point in focus situation, and superimpose the indicator mark as a mark representing that the selected focus point is in a focused situation.

The camera according to the present invention further has a focus point luminance detector that detects a luminance of the position. Then, the superimposer superimposes the indicator mark such that a brightness of the indicator mark increases more as the luminance of the image point increases more. The superimposer may adjust the light-intensity in accordance with the luminance, whereas the superimposer adjusts an illuminating-time in accordance with the luminance, for example, when an LED is used for an illuminator.

The focus point luminance detector may use a luminance level detected by a multi-segment meter that measures brightness of a subject on the basis of multiple segments. The multiple segments are defined on the subject image, and the multiple focus points are assigned to the multiple segments. Then, the focus point luminance detector detects the luminance of the position in accordance with the brightness of a corresponding segment.

On the other hand, the focus point luminance detector may detect a luminance level by using an AF image sensor for focusing. For example, the camera may have a multipoint auto-focus adjuster that focuses the subject image by using a phase-matching method that detects a defocus-amount by using an image sensor for focusing. In this case, the focus point luminance detector may detect the luminance in accordance with an amount of light directed to a corresponding point on the image sensor.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiments of the present invention are described with reference to the attached drawings.

Figure 1:
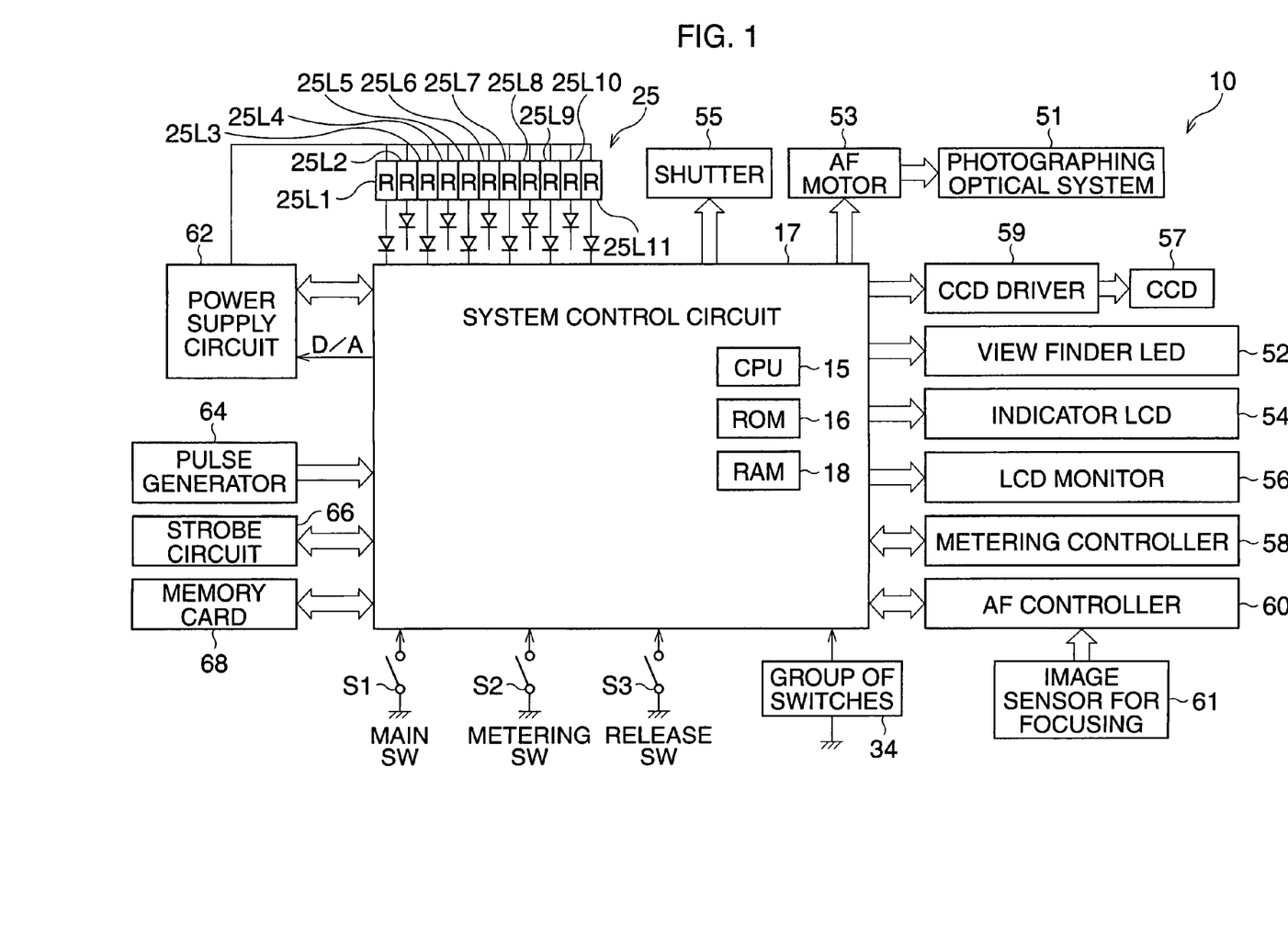
FIG. 1 is a block diagram of a digital camera according to a first embodiment.

FIG. 1 is a block diagram of a digital camera according to a first embodiment.

When a main switch S1 is turned ON by operating a main power button (not shown), the electric power is supplied from a power supply circuit 62 to a system control circuit 17 including a CPU 15, a ROM 16, and a RAM18, as well as other circuits. The system control circuit 17 controls the camera 10, and feeds control signals to a viewfinder display 54, an LCD monitor 56, a metering controller 58, an AF controller 60, a pulse generator 64, a strobe circuit 66, and so on.

When a metering switch S2 is turned ON by depressing a release button (not shown) halfway, the brightness of a subject is detected by the metering controller 58. Herein, a multi-segment metering method is performed. Exposure values such as a shutter speed and F number, are calculated on the basis of the brightness. Also, the exposure values are displayed on the viewfinder display 54, which is viewed below the subject image, by illuminating a viewfinder LEDs 52, so that the user can confirm the exposure values while viewing the subject image via a viewfinder (herein, not shown).

The AF controller 60 detects whether the subject image is in focus by detecting a defocus-amount obtained from the light received on an AF image sensor 61 for focusing. A focusing lens in a photographing optical system 51 is shifted by the AF motor 53 on the basis of the detected defocus-amount. Multipoint auto-focus adjustment can be performed, wherein multiple focus points are defined on the subject image to be viewed via the viewfinder. The user can select a manual-selection mode where the user selects one focus point, or an auto-selection mode that automatically sets a focus point, by operating a cross button (not shown).

When a release switch S3 is turned ON by depressing the release button fully, the photograph motion is performed. The shutter opens and closes so that the subject image is formed on a CCD 57. Then, image-pixel signals corresponding to the subject image are read from the CCD 57 by the CCD driver 59, and the image-pixel signals are subjected to various processes to produce image-data. The image data is compressed in the system control circuit 17 and is recorded in a memory card 68. When a playback mode is selected by operating a mode dial (not shown), a switch in a group of switches 34 is turned ON, and the recorded image is displayed on the LCD monitor 56.

A light source 25 has eleven LEDs 25L1, 25L2, ..., and 25L11, which respectively superimpose eleven focus-points on the subject image. Electric current is fed to a given LED, thus the corresponding LED emits light.

Figure 2:
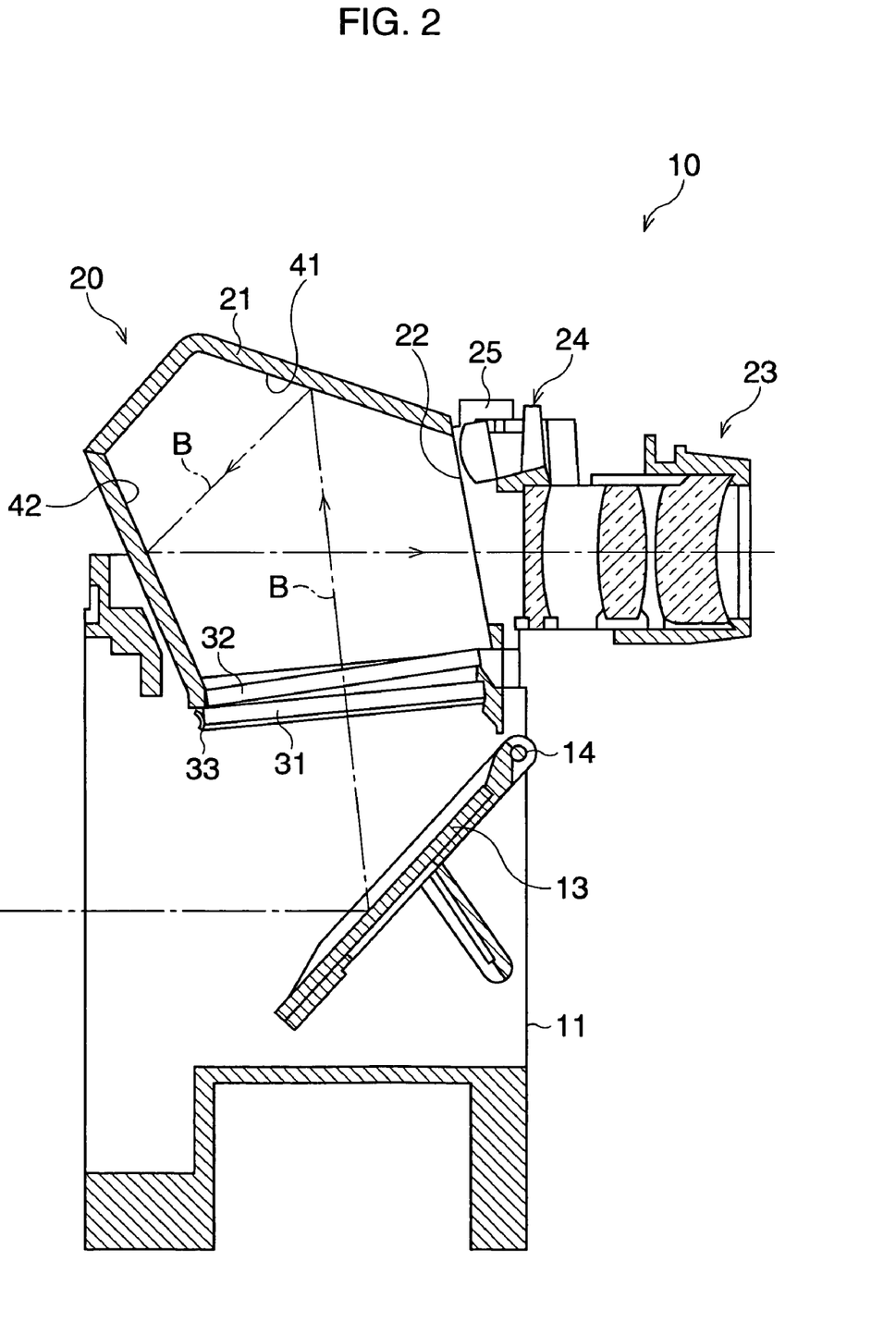
FIG. 2 is a cross section view of the viewfinder.
Figure 3:
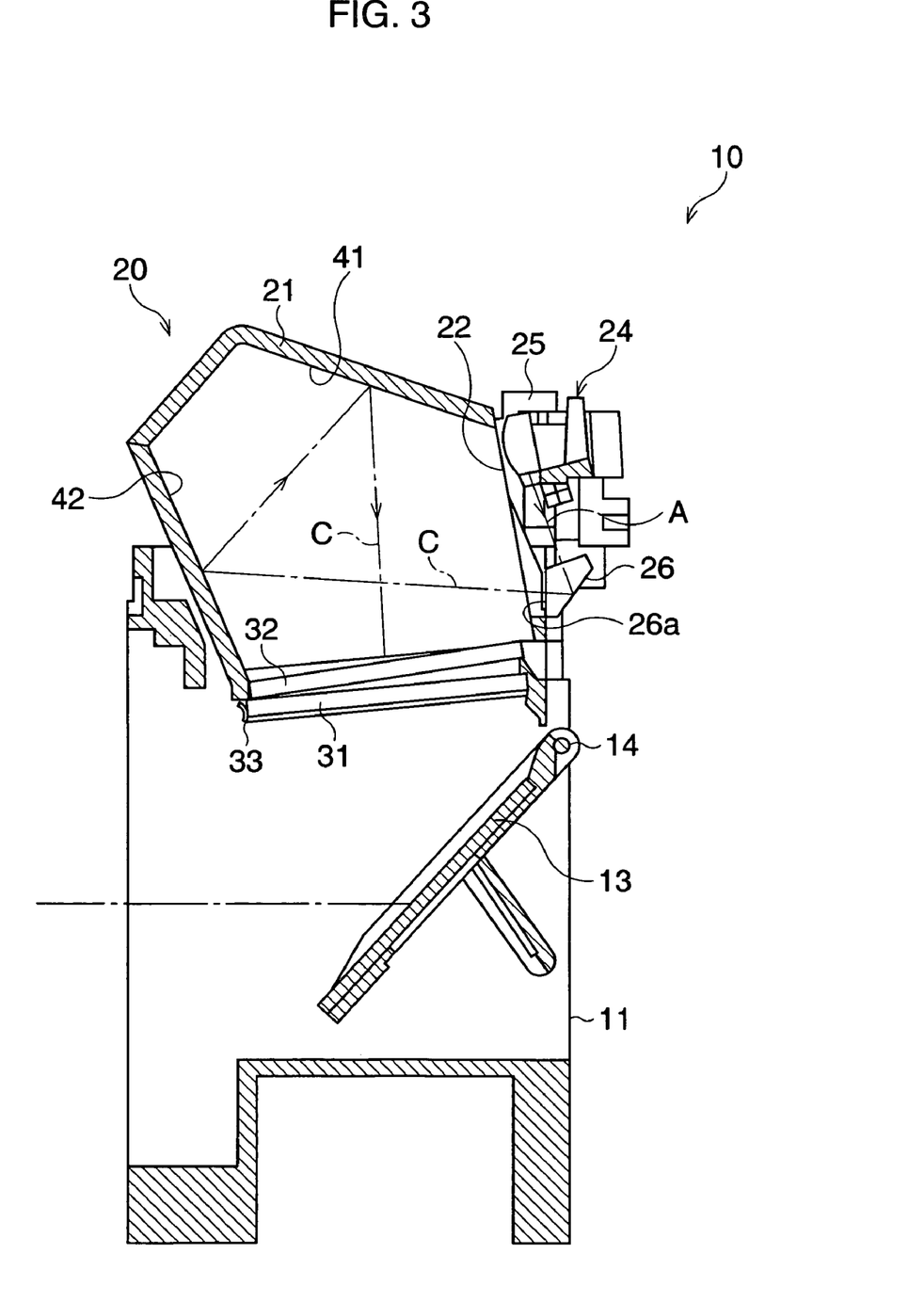
FIG. 3 is a cross section view of the viewfinder.

FIGS. 2 and 3 are cross section views of the viewfinder.

A quick return mirror 13 is provided in a mirror box 11, which is formed backward of the photographing optical system 51, and is pivotable around a pin 14. The viewfinder 20 for an SLR type camera is provided upward of the mirror box 11, and has a pentagonal roof prism 21, a focusing glass 31, a field lens (not shown), a screen for superimposing 32, and an eyepiece 23. Note, the eyepiece is not shown in FIG. 3. The screen 32 is arranged apart from the focusing glass 31 by a given distance and is inclined to the focusing glass 31. The focusing glass 31 and the screen 32 are supported by a supporting frame 33. A light detector 24 for metering is provided adjacent to a generally triangular-like exit portion 22 of the pentagonal roof prism 21.

Light "B", passing through the photographing optical system 51 and reflected on the quick return mirror 13, passes through the focusing glass 31 and the screen 32. The pentagonal roof prism 21 has a pair of roof reflecting surfaces 41 and a front reflecting surface 42, and the light "B" is reflected on the pair of roof reflecting surfaces 41 and the front reflecting surface 42 in order. The light "B" reflected on the front reflecting surface 42 passes through the exit portion 22 and enters into the eyepiece 23. Thus, a subject image formed on the focusing glass 31 is viewed via the eyepiece 23. Also, the light "B" enters into the light detector 24 so that the brightness of the subject is detected.

As shown in FIG. 3, the light source 25, an illuminating prism 26 is provided backward of the exit portion 22 so as not to interfere with the light-path for the light detector 24. One LED among the eleven LEDs 25L1 to 25L11, constructing the light source 25, emits illuminating light "C", which enters into the illuminating prism 26 and is directed to the front reflecting surface 42. Then, the illuminating light "C" is reflected on the front reflecting surface 42 and the pair of the roof reflecting surfaces 41 in order. The illuminating light "C" reflected on the pair of the roof reflecting surfaces 41 reaches a given position on the screen 32.

Figure 4:
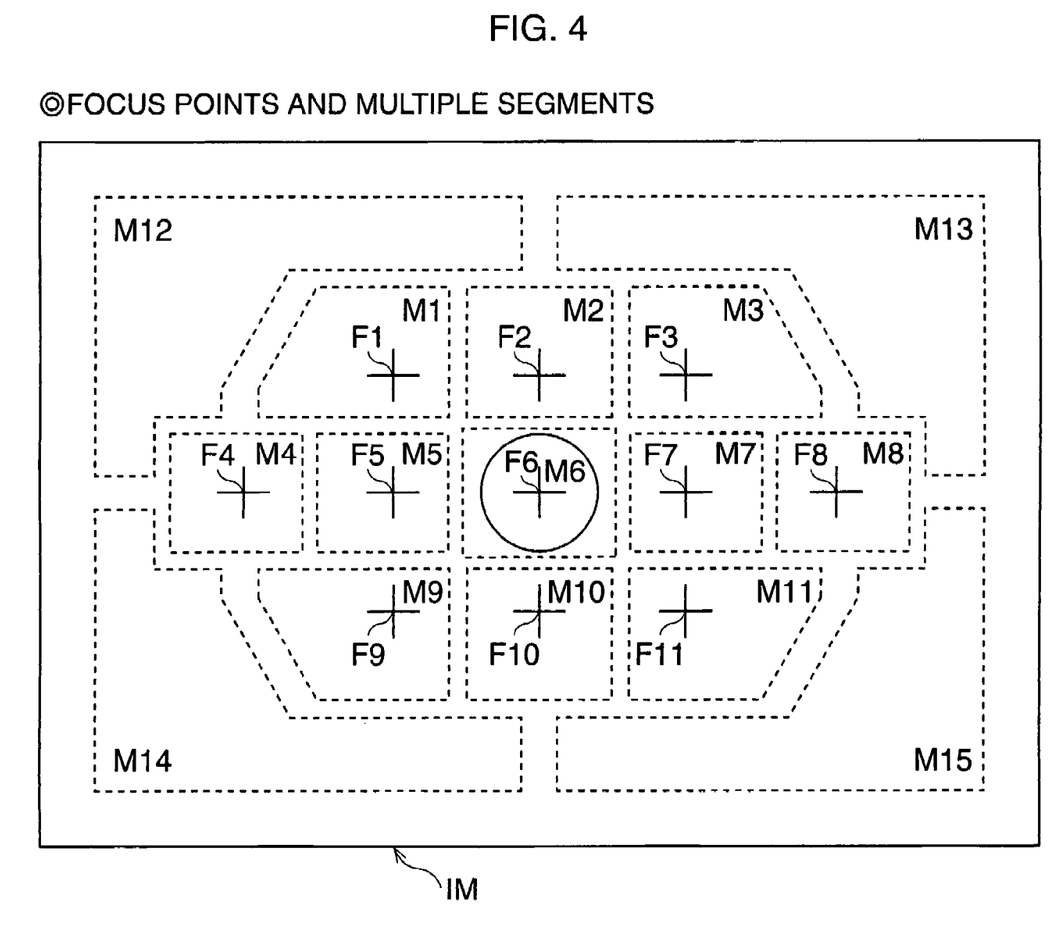
FIG. 4 is a view showing an arrangement of multiple segments for metering and positions of multiple focus points.
Figure 5:
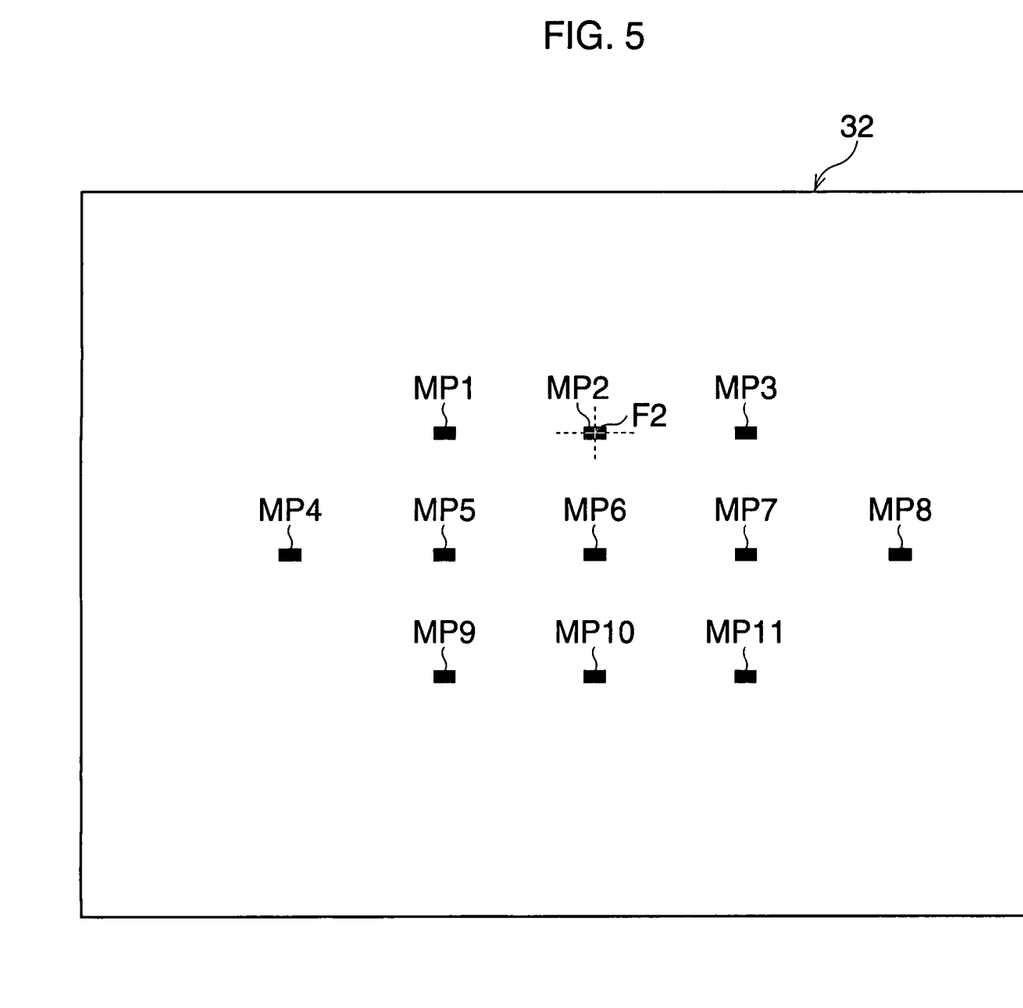
FIG. 5 is a plan view of the screen 32 seen from the upper side.
Figure 6:
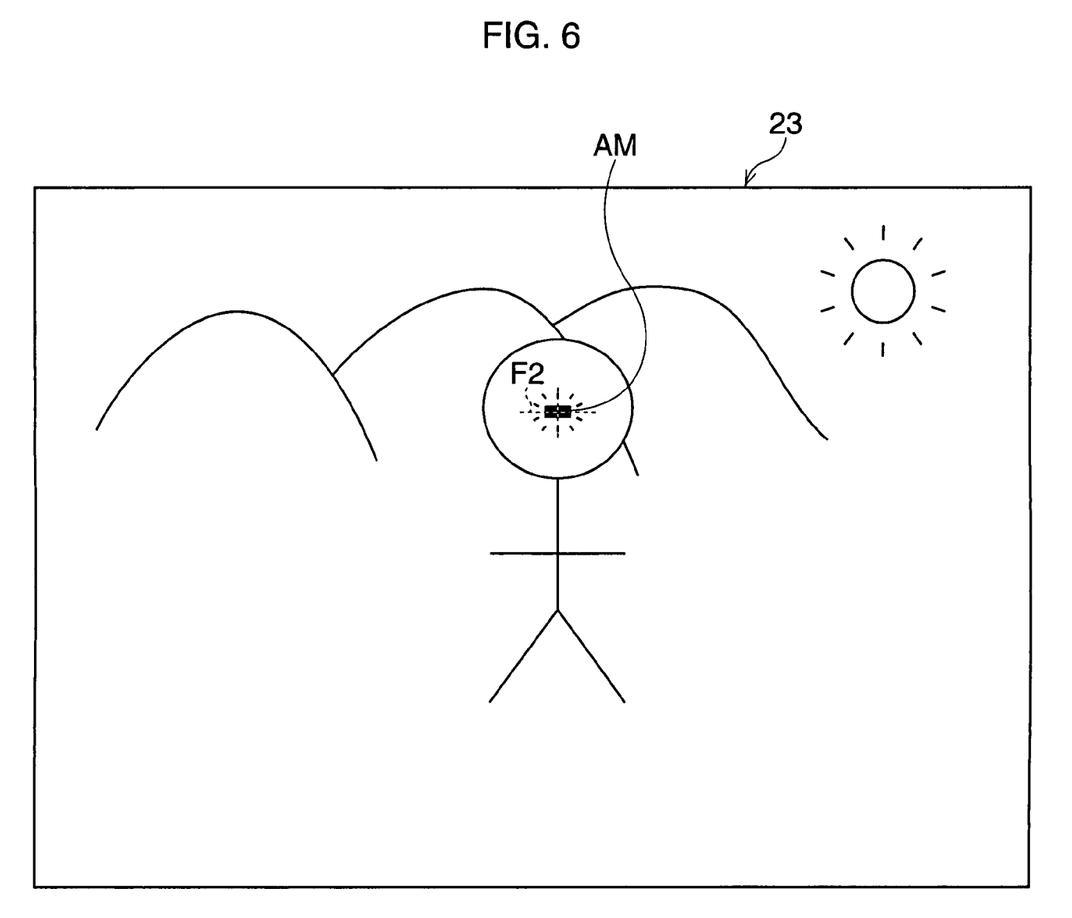
FIG. 6 is a view showing a subject image viewed via the eyepiece.

FIG. 4 is a view showing an arrangement of multiple segments for metering and positions of multiple focus points. FIG. 5 is a plan view of the screen 32 seen from the upper side. FIG. 6 is a view showing a subject image viewed via the eyepiece 23.

As shown in FIG. 4, fifteen segments M1 to M15 are defined on the subject image viewed via the eyepiece 23, namely, the fifteen segments M1 to M15 are defined on the focusing glass 31. The luminance of each segment is detected by the light detector 24. On the other hand, eleven focus points F1 to F11 are defined on the subject image so as to match the positions of the focus points F1 to F11 with the positions of the segments M1 to M11. Note, a cross mark indicating the focus point and a boundary line of each segment, shown in FIGS. 4 to 6, given only for explanation, and are actually invisible.

As shown in FIG. 5, eleven micro prisms MP1 to MP11 are formed on the screen 32 in accordance with the defined positions of the eleven focus points F1 to F11. For example, the micro prism MP2 is formed at a position corresponding to the focus point F2. The eleven LEDs 25L1 to 25L11 respectively emit light toward the micro prisms MP1 to MP11. The cross section of each micro prism is wave-like, and each micro prism reflects light emitted from a corresponding LED to direct the light to the eyepiece 23.

When an LED corresponding to a given focus point, which is in focus, is illuminated toward a corresponding micro prism, a focus mark "AM", which is a light-indicator, is viewed on the position of the corresponding focus point by the reflection of light, as shown in FIG. 6. The focus mark "AM" is superimposed in red on the subject image viewed via the eyepiece 23. In FIG. 6, the focus mark "AM" is superimposed on the focus point F2 by illuminating the LED 25L2.

Figure 7:
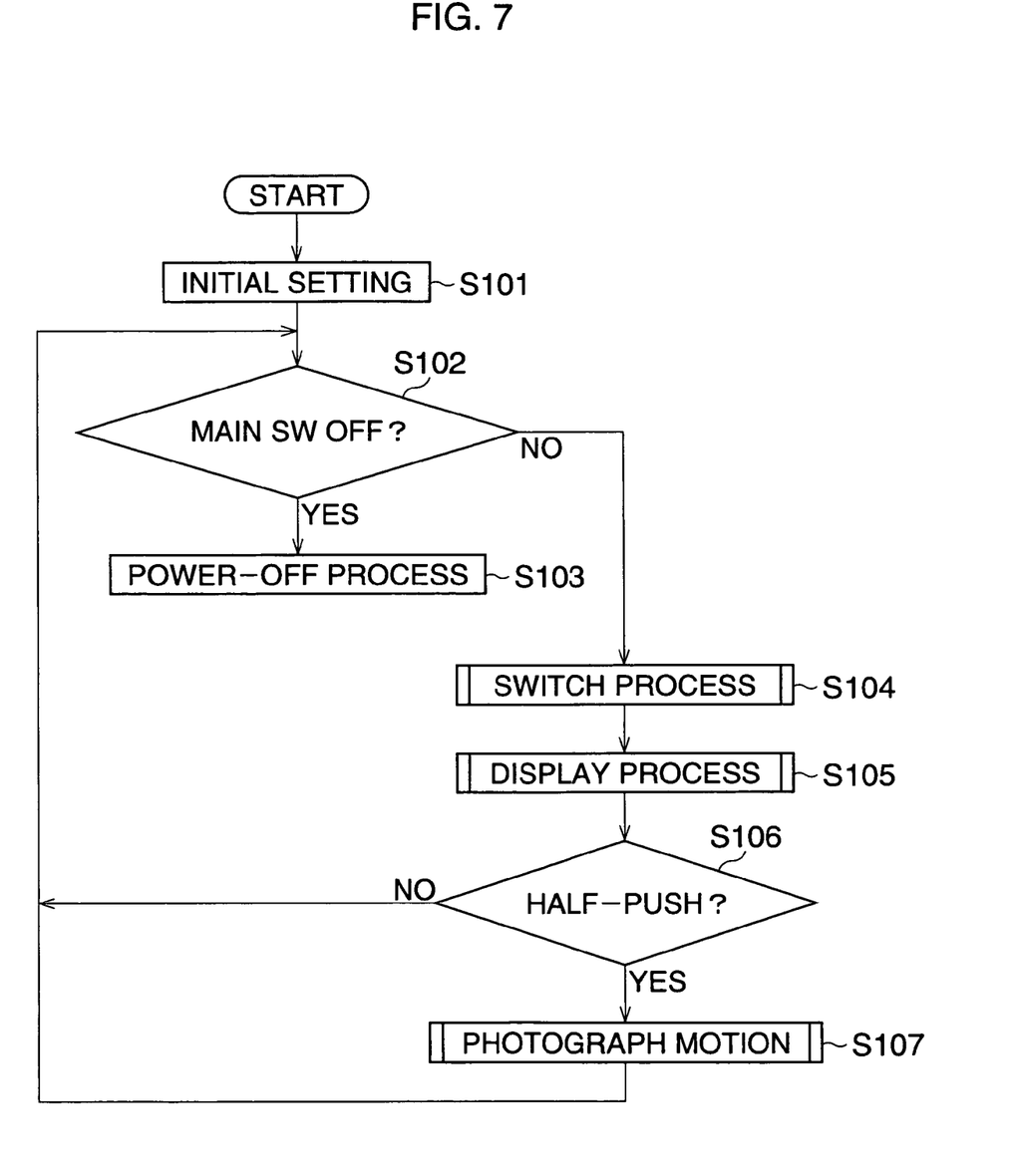
FIG. 7 is a view showing a main flowchart of the photograph motion.

FIG. 7 is a view showing a main flowchart of the photograph motion. The process starts when the main power source is turned ON.

In Step S101, the initial setting is performed for the CPU 15, and so on. In Step S102, it is determined whether the electric power is turned OFF by the user's operation. When it is determined that the electric power is turned OFF, the process goes to Step S103, the power-OFF process is performed. On the other hand, when it is determined that the electric power is not turned OFF, the process goes to Step S104.

In Step S104, a switch process according to the operation to the mode dial or the cross button is performed. In Step S105, a display process for the LCD monitor 56 is performed. In Step S106, it is determined whether the metering switch S2 is turned ON by depressing the release button halfway. When it is determined that the metering switch S2 is not turned ON, the process returns to Step S102. On the other hand, when it is determined that the metering switch S2 is turned ON, the process goes to Step S107, wherein the photograph motion process is performed.

Figure 8:
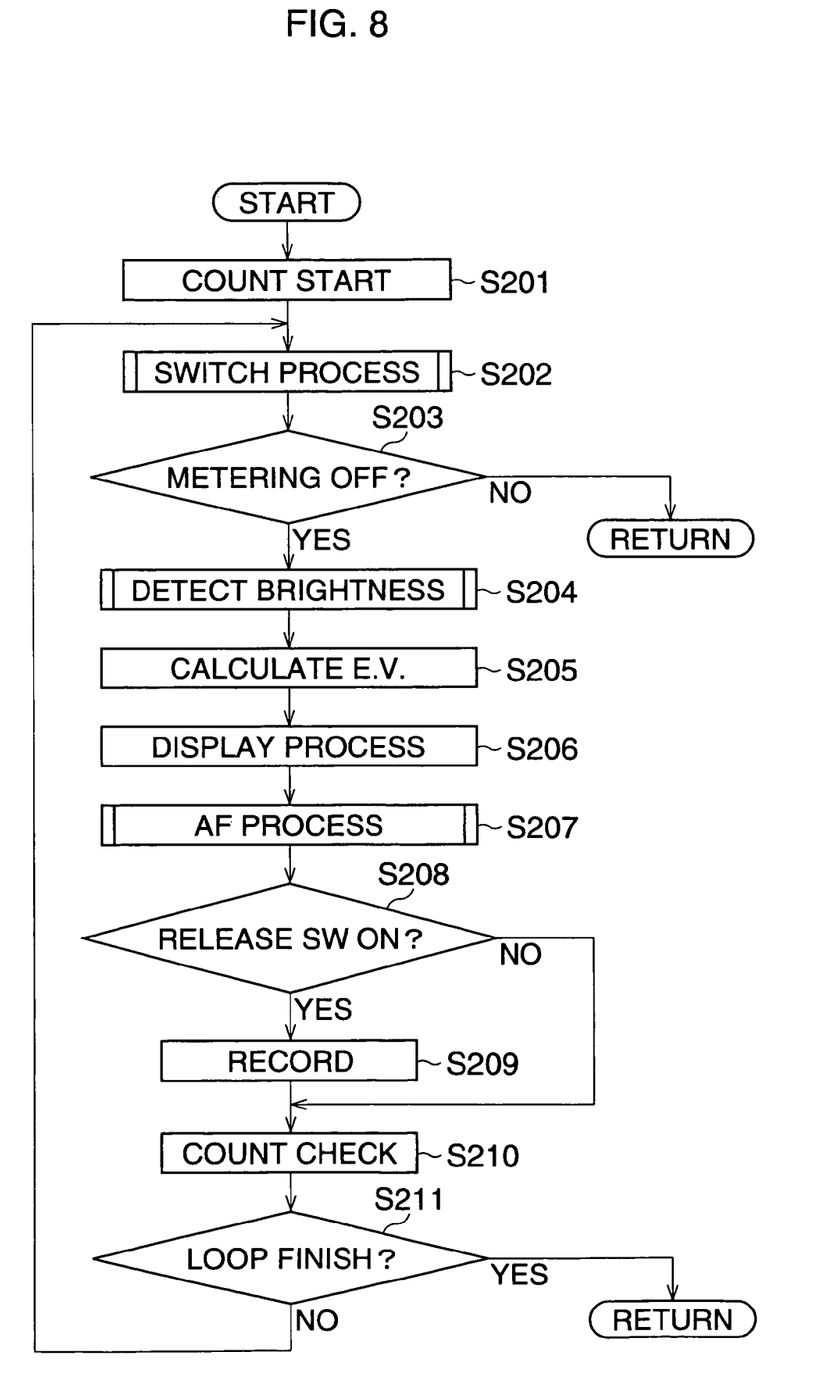
FIG. 8 is a view showing a subroutine of Step S107 in FIG. 7.

FIG. 8 is a view showing a subroutine of Step S107 in FIG. 7.

In Step S201, the counting of time is started to measure a loop-interval. In Step S202, a switch process is performed.

In Step S203, it is determined whether the metering is impossible due to any reason such as an open of a memory card cover, etc. When it is determined that the metering is impossible, the process is terminated. On the other hand, when it is determined that the metering is possible, the process goes to Step S204.

In Step S204, the brightness of the subject detected by the light detector 24. Herein, the luminance level of the subject image is represented by 256 scales (0 to 255). In Step S205, the exposure vales, such as shutter speed and F number, are calculated. In Step S206, a display process for indicating the exposure values on the viewfinder display 54 is performed by illuminating the viewfinder LEDs 52. After step S206 is performed, the process goes to Step S207, wherein the auto-focus adjustment process is performed.

Figure 9:
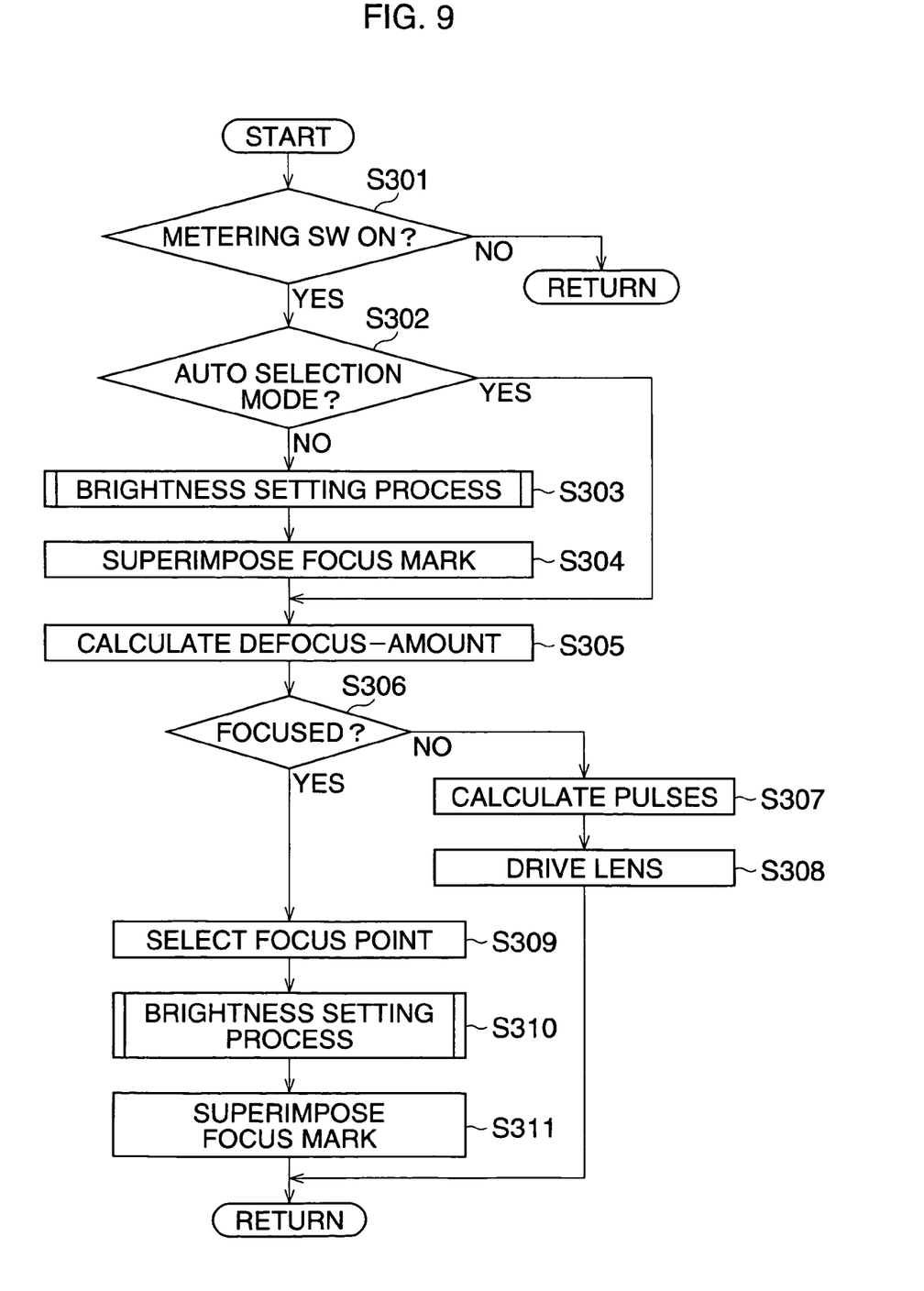
FIG. 9 is a view showing a subroutine of Step S207 in FIG. 8.

FIG. 9 is a view showing a subroutine of Step S207 in FIG. 8.

In Step S301, it is determined whether the metering switch S2 is ON. When it is determined that the metering switch S2 is not ON, the process is terminated. On the other hand, when it is determined that the metering switch S2 is ON, the process goes to Step S302, wherein it is determined whether the auto-selection mode is set by the user. When it is determined that the auto-selection mode is set, the process skips to Step S305. On the other hand, when it is determined that the auto-selection mode is not set, namely, the manual-selection mode is set, the process goes to Step S303, wherein a brightness setting process is performed.

Figure 10:
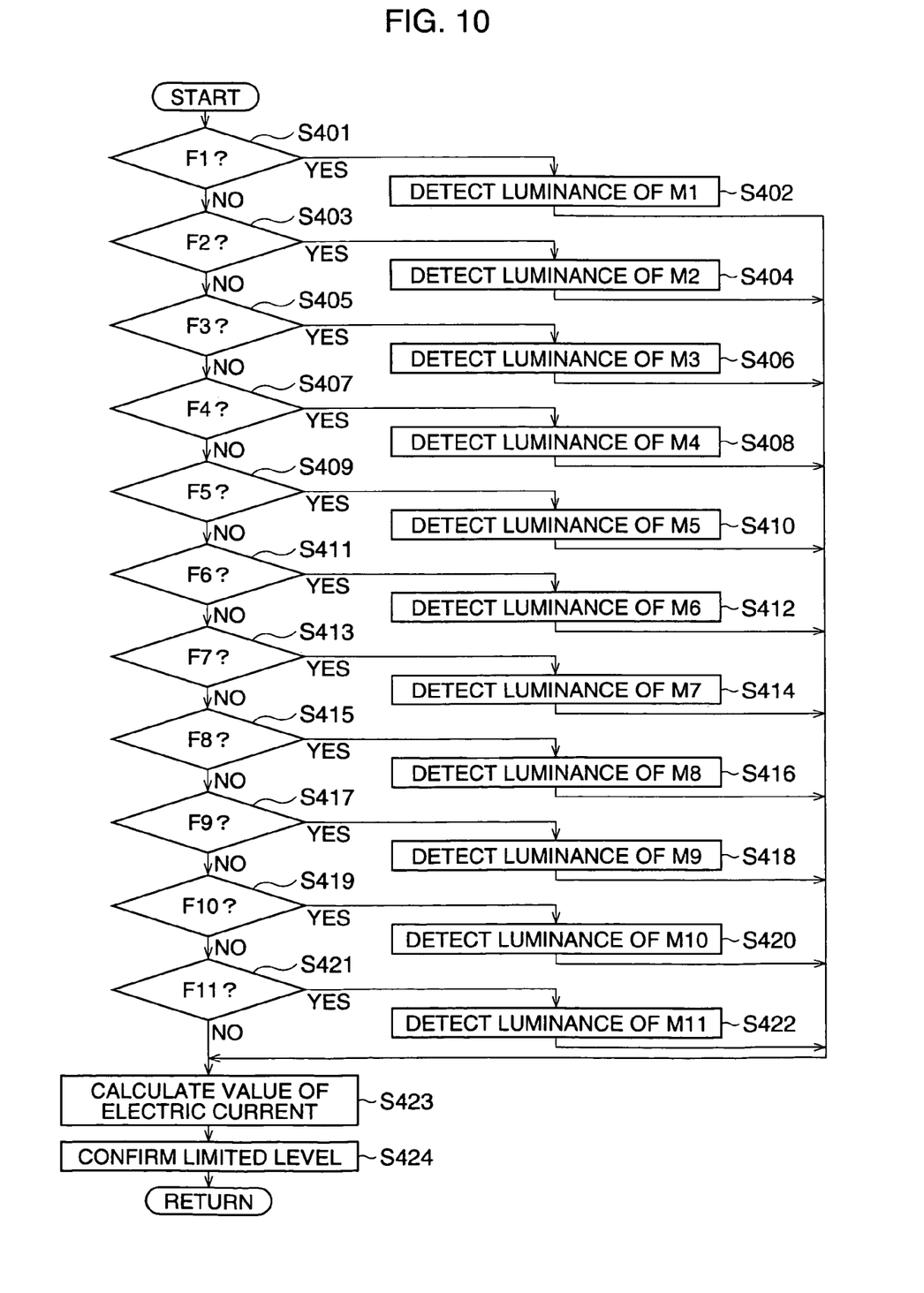
FIG. 10 is a view showing a subroutine of Step S303 in FIG. 9.

FIG. 10 is a view showing a subroutine of Step S303 in FIG. 9.

In Step S401, it is determined whether the focus point F1 corresponding to the metering segment M1 is selected as an AF adjustment point by the operation to the cross button. When it is determined that the focus point F1 corresponding to the metering segment M1 is selected, the process goes to Step S402, wherein a luminance level of the segment M1 is detected by the light detector 24 as a luminance level of the focus point F1, and the luminance signal is fed to the system control circuit 17. Herein, an average luminance level of the segment is detected. On the other hand, when it is determined that the focus point F1 corresponding to the metering segment M1 is not selected, the process goes to Step S403.

Similarly, in Step S403 to S421, it is determined whether the focus points F2, F3, . . . , and F11 are selected, and the luminance level of corresponding segment is detected.

In Step S423, the light-intensity of the LED to be illuminated, namely, the brightness of the focus mark AM to be superimposed is calculated in accordance with the detected luminance level of the segment. A voltage supplied to the LED is determined such that the light-intensity becomes larger as the luminance level of the corresponding segment becomes larger. In other words, the voltage becomes smaller as the detected luminance level becomes smaller.

In this embodiment, the electric current of the diode, namely, the light-intensity is calculated in accordance with the following formula.

$$y=kx+b \qquad (1)$$

Note, the luminance level of the focus mark AM to be superimposed is represented by "y", the luminance level of the segment corresponding to the position of the focus mark AM to be superimposed is represented by "x", "k" is a constant, and "b" is an offset value. A corresponding relationship between the light-intensity and the value of electric current supplied to the LED element is stored in the ROM 16 in advance, and the value of the electric current is calculated on the basis of the value of "y". The value of the electric current is in proportion to the luminance level.

In Step S424, it is confirmed that the calculated value of the electric current is in a given range from a minimum limited value to a maximum limited value. When the value of electric current is out of the range, the value of the electric current is set to the maximum or minimum limited value. After Step S424 is performed, the process goes to Step S304 in FIG. 9.

In Step S304, the LED corresponding to the selected focus point is illuminated in accordance with brightness of the focus mark AM determined in Step S303 (S401 to S423). Namely, the focus mark AM is superimposed on the position of the selected focus point so that the focus mark AM is viewed via the eyepiece 23. In this case, the focus mark AM is superimposed as a mark that represents a selected focus point, which is different from the auto-selection mode, as described later.

In Step S305, the defocus-amount is detected on the basis of the signal output from the AF image sensor 61. Herein, the phase-difference or phase matching method is performed to detect the defocus-amount of the multiple focus points. In Step S306, it is determined whether the defocus-amount is in the depth of field, namely, the subject image is in focus. In the case of the manual-selection mode, the defocus-amount corresponding to the selected focus point is detected. In the case of the auto-selection mode, the defocus-amount is detected for each focus point.

When it is determined that the defocus-amount is not in the depth of field in Step S306, the process goes to Step S307, wherein the number of pulses for driving a stepping motor (not shown), which shifts the lens, is calculated in accordance with the defocus-amount. Note that, in the case of auto-selection mode, the focus adjustment is performed for the predetermined primary focus point. In Step S308, the lens is driven by a calculated-amount.

On the other hand, when it is determined that the defocus-amount of the selected focus point or at least one focus point is in the depth of field in Step S306, the process goes to Step S309, wherein one focus point, namely, the selected focus point, one focus point in focus, or one focus point among plural focus points in focus, is set or selected to superimpose the focus mark AM. Herein, a center focus point "F6" is primarily set in the auto-selection mode.

In Step S310, similarly to Step S303, the brightness of the focus mark "AM" is set, namely, the electric current is calculated. Then, in Step S311, the focus mark AM is superimposed in red on the corresponding focus point. In this case, the focus mark AM is superimposed as a mark that represents a focus of the selected focus point. After Step S311 is performed, the process goes to Step S208 in FIG. 8.

In FIG. 8, it is determined whether the release switch S3 is turned ON by fully depressing the release button. When it is determined that the release switch S3 is not turned ON, the process skips to Step S210. On the other hand, when it is determined that the release switch S3 is turned ON, the process goes to Step S209, wherein the photograph motion is performed so that the subject image is recorded.

In Step S210, the time is counted from when the subroutine starts.

In Step S211, it is determined whether the time has passed the loop-interval, which is, for example, a multiple of 128 (ms). When it is determined that the time has not passed the loop-interval, the process returns to Step S202. On the other hand, when it is determined that the time has passed the loop-interval, the photograph motion process is terminated. The main routine of Step S102 to S107 shown in FIG. 4 is repeatedly performed until the main power is turned OFF.

Figure 11:
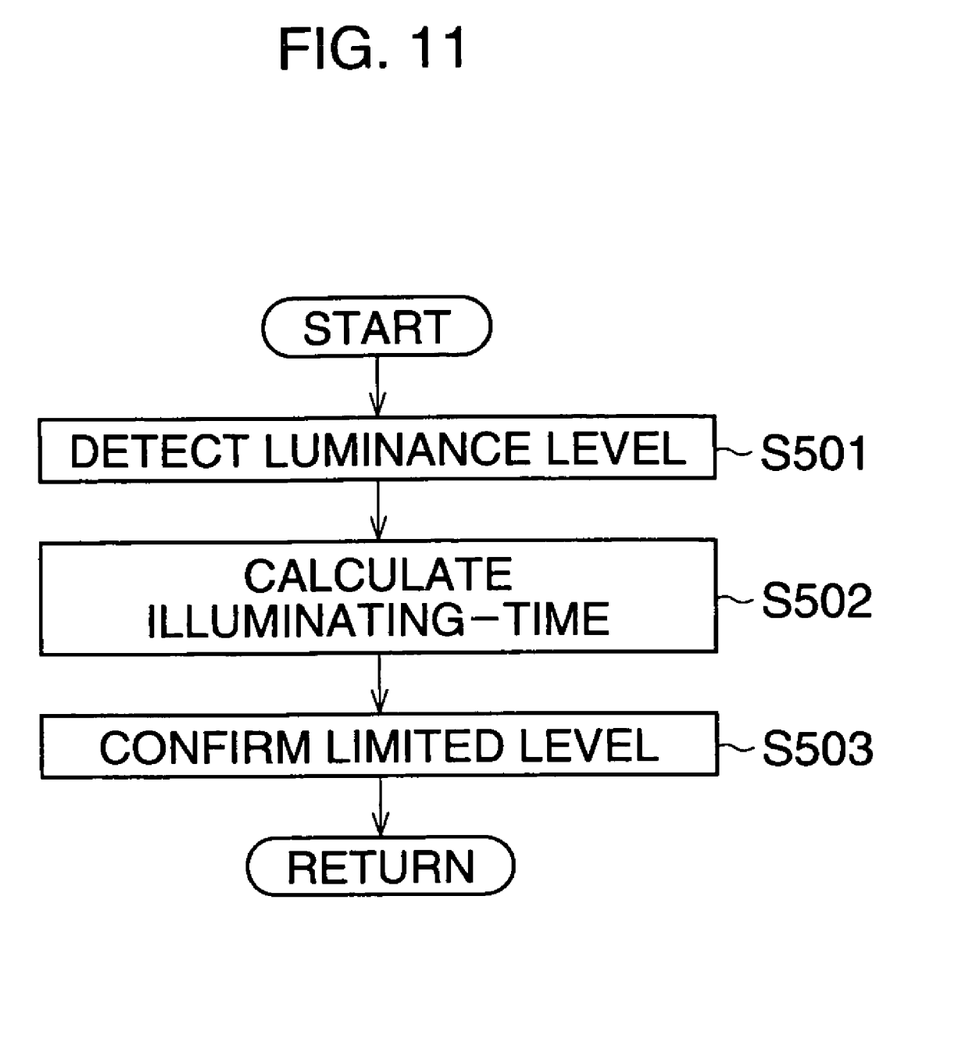
FIG. 11 is a view showing a flowchart of the brightness setting process according to the second embodiment.
Figure 12:
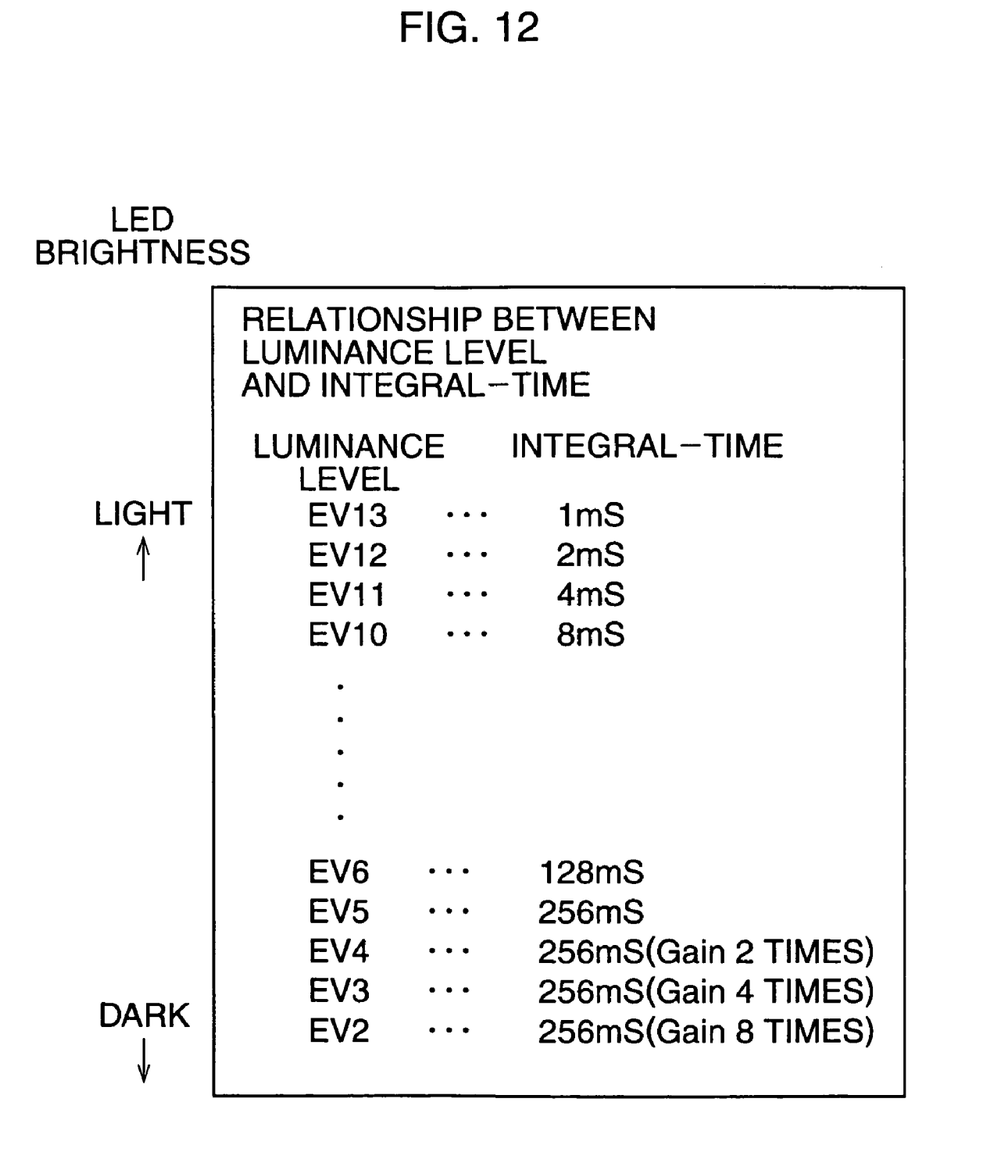
FIG. 12 is a view showing a relationship between the luminance level of the focus point and the integral light-receiving time.

With reference to FIGS. 11 and 12, a camera according to a second embodiment is explained. The second embodiment is different from the first embodiment in that the luminance level of the focus point is detected in accordance with light that reaches the AF image sensor 61 for focusing. Further, the brightness of the focus mark is adjusted by a lighting-time. Other constructions are the same as those of the first embodiment.

FIG. 11 is a view showing a flowchart of the brightness setting process according to the second embodiment, which is performed as a subroutine of Step S310. FIG. 12 is a view showing a relationship between the luminance level of the focus point and the integral light-receiving time of the AF image sensor 61.

In Step S501, the integral light-receiving time of the image sensor 61 is detected, and the luminance level is calculated.

Note that, the integral light-receiving time is detected for the position corresponding to the focus point selected in Step S309.

As shown in FIG. 12, as for the AF image sensor 61, the integral total light-receiving time becomes shorter as the luminance level of the light, which reaches the image sensor 61, becomes greater. Note that, the luminance level is herein represented by voltage (EV). The brightness of the selected focus point is determined in accordance with the total light-receiving time.

In Step S502, an illuminating-time of the LED is calculated in accordance with the detected luminance level. Each LED emits light in pulses, therefore, the brightness of the focus mark AM becomes greater as the lighting-time becomes greater. In Step S503, similarly to Step S424, the calculated electric current is confirmed. Then, similarly to the first embodiment, the focus mark AM is superimposed as shown in Step S311 in FIG. 9. The luminance level of the focus point may be detected regardless of the multiple segments M1 to M16 for metering.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2004-184789 (filed on Jun. 23, 2004), which is expressly incorporated herein, by reference, in its entirety.

The invention claimed is:

1. A camera, comprising:
a viewfinder that forms a subject image to be observed;
a multipoint auto-focus adjuster that focuses the subject image on the basis of multiple focus points defined on the subject image;
a superimposer that superimposes an indicator mark at a position of a given focus point that is made in-focus by the multipoint auto-focus adjuster; and
a focus point luminance detector that detects a luminance of the subject image at the position;
wherein said superimposer superimposes the indicator mark such that a brightness of the indicator mark increases as the detected luminance at the position increases.

2. The camera of claim 1, further comprising:
a multi-segment meter that measures brightness of a subject on the basis of multiple segments that are defined on the subject image, said multiple focus points being assigned to the multiple segments;
wherein the focus point luminance detector detects the luminance of the subject image at the position in accordance with a brightness of a corresponding segment.

3. The camera of claim 1, wherein the multipoint auto-focus adjuster that focuses the subject image by using a phase-matching method that detects a defocus-amount by using an image sensor for focusing;
wherein said focus point luminance detector detects the luminance of the subject image at the position in accordance with an amount of light directed to a corresponding point on the image sensor.

4. The camera of claim 1, wherein said superimposer comprises:
an illuminator that illuminates light for forming the indicator mark; and
a light guide member that guides the light to the multiple focus points in said viewfinder by reflecting the illuminated light,
wherein said superimposer adjusts a light-intensity in accordance with the luminance.

5. The camera of claim 1, wherein said superimposer comprises:
an illuminator that illuminates light for forming the indicator mark; and
a light guide member that guides the light to the multiple focus points in said viewfinder by reflecting the illuminated light,
wherein said superimposer adjusts an illuminating-time in accordance with the luminance.

6. The camera of claim 1, wherein the superimposer superimposes the indicator mark as a mark representing a focus point selected from the multiple focus points by a user.

7. The camera of claim 1, wherein the superimposer selects one focus point in a focused situation, and superimposes the indicator mark as a mark representing that the selected focus point is in focus.

8. An apparatus for superimposing an indicator mark on a multiple focus points, comprising:
a superimposer that superimposes an indicator mark at a position of a given focus point that is made in-focus by a multipoint auto-focus adjuster; and
a focus point luminance detector that detects a luminance of the image at the position;
wherein said superimposer superimposes the indicator mark such that a brightness of the indicator mark increases as the detected luminance at the position increases.

* * * * *